(12) United States Patent
Wolpert et al.

(10) Patent No.: US 12,381,149 B2
(45) Date of Patent: Aug. 5, 2025

(54) CELL OPTIMIZATION THROUGH SOURCE RESISTANCE IMPROVEMENT

(71) Applicant: International Business Machines Corporation, Armonk, NY (US)

(72) Inventors: David Wolpert, Poughkeepsie, NY (US); Leon Sigal, Monsey, NY (US); Bharat Biyani, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 17/657,304

(22) Filed: Mar. 30, 2022

(65) Prior Publication Data
US 2023/0317610 A1    Oct. 5, 2023

(51) Int. Cl.
*H01L 23/528* (2006.01)
*G06F 30/392* (2020.01)
*H01L 23/522* (2006.01)

(52) U.S. Cl.
CPC ........ *H01L 23/5286* (2013.01); *G06F 30/392* (2020.01); *H01L 23/5226* (2013.01)

(58) Field of Classification Search
CPC .................... H01L 21/5286; H01L 21/5226
See application file for complete search history.

(56) References Cited

U.S. PATENT DOCUMENTS

| | | | |
|---|---|---|---|
| 7,224,024 B2 | 5/2007 | Forbes |
| 8,354,317 B2 | 1/2013 | Eppich |
| 9,496,314 B1 | 11/2016 | Lu et al. |
| 10,885,260 B1 | 1/2021 | Wolpert et al. |
| 10,910,058 B2 | 2/2021 | Pi et al. |
| 2014/0068543 A1 | 3/2014 | Yuan et al. |
| 2015/0035070 A1 | 2/2015 | Chiang et al. |
| 2018/0114755 A1 | 4/2018 | Kirimura |
| 2018/0165399 A1 | 6/2018 | Yang et al. |
| 2019/0123140 A1 | 4/2019 | Park et al. |
| 2021/0407985 A1 | 12/2021 | Chen et al. |

OTHER PUBLICATIONS

Cline, B. T., Joshi, V., Sylvester, D., & Blaauw, D. (Nov. 2008). STEEL: A technique for stress-enhanced standard cell library design. In 2008 IEEE/ACM International Conference on Computer-Aided Design (pp. 691-697). IEEE.
Tamai, S., & Watanabe, S. (2015). Low Cost Stacked Type NOR MRAM with 1 MOSFET/1 MTJ Cell Structure and Shared Source Line (SL) Scheme. Department of Information Science, Shonan Institute of Technology, Fujisawa, Japan.
U.S. Appl. No. 17/480,551, filed Sep. 21, 2021.

(Continued)

*Primary Examiner* — David A Zarneke
(74) *Attorney, Agent, or Firm* — Patterson + Sheridan, LLP

(57) ABSTRACT

Method and structures for shared (dual) sources for a single device in semiconductor devices such as very-large-scale integration (VLSI) devices. The shared-source improves or increases a current that passes through the device (e.g., to a drain region associated with the shared-source), which in turn increases a performance of the device. Example improvements may include a delay improvement of the device and associated logic paths and/or a power improvement for the device. The method includes operations for design improvements during a design process by implementing shared-sources in a semiconductor device design.

14 Claims, 13 Drawing Sheets

(56) References Cited

OTHER PUBLICATIONS

U.S. Appl. No. 17/399,397, filed Aug. 11, 2021.
U.S. Appl. No. 17/401,441, filed Aug. 13, 2021.
U.S. Appl. No. 17/411,113, filed Aug. 25, 2021.
U.S. Appl. No. 17/479,246, filed Sep. 20, 2021.
Authors et al., "Region-Based Line-End Optimization for Achieving DFM Line End Extensions while Avoiding 2-step / 3-step / 4-step Issues," IP.Com, dated Nov. 16, 2021 for IP.com No. IPCOM000267713D.
Authors et al., "A Method for Optimizing Decoupling Capacitor Efficiency in Densely Routed Regions," ip.com, IP.com No. IPCOM000269202D, Dated Mar. 29, 2022, pp. 1-4.
Authors et al., "Cell Optimization Exploiting Diffusion Break Strain Distance to Active FETs," ip.com, IP.com No. IPCOM000271045D, Dated Oct. 4, 2022, pp. 1-4.
PCT, Notification of Transmittal of The International Search Report and The Written Opinion of The International Searching Authority, or The Declaration for Application PCT/IB2023/052908 Dated: Sep. 22, 2023.

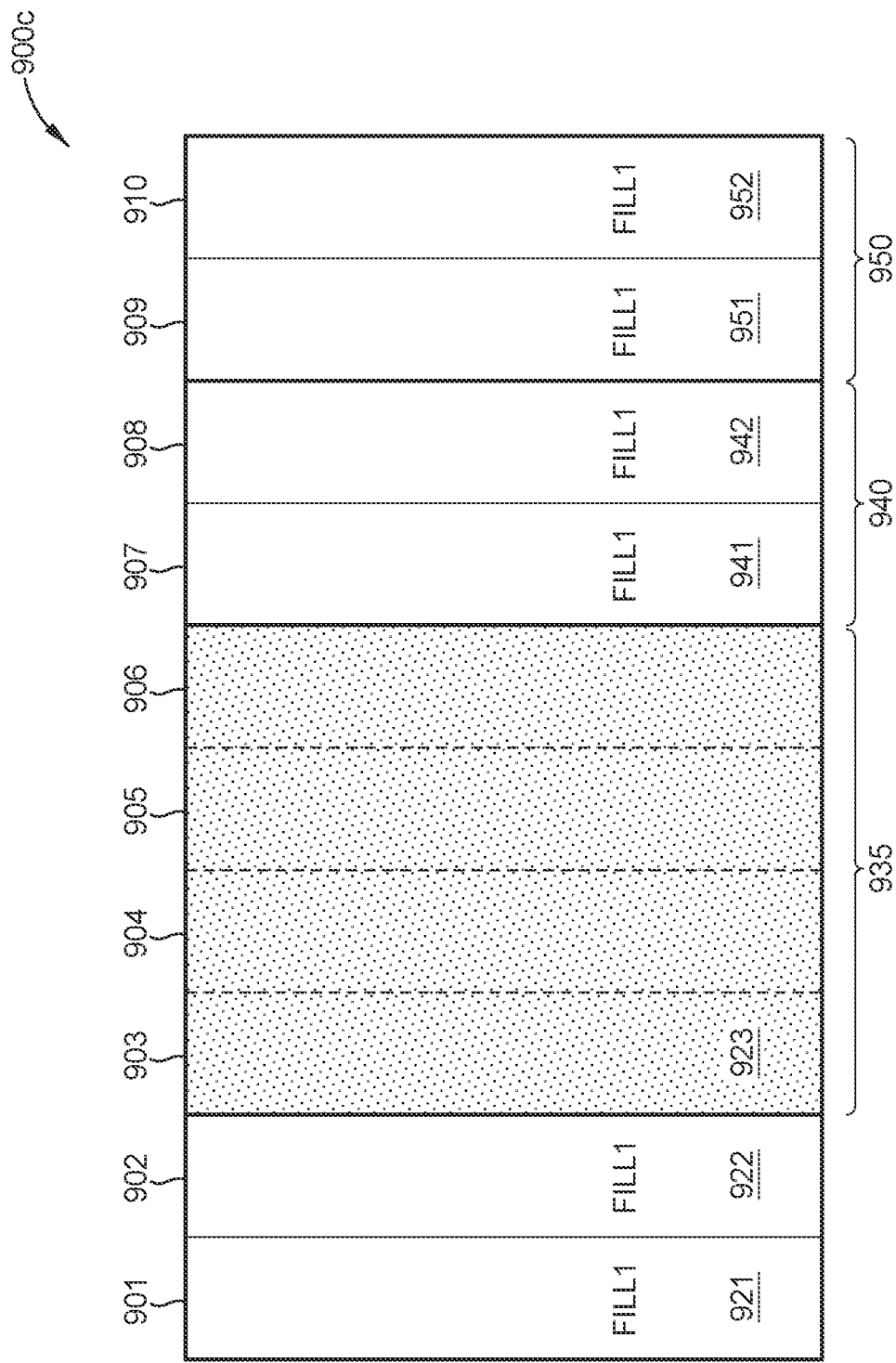

CELL OPTIMIZATION THROUGH SOURCE RESISTANCE IMPROVEMENT

BACKGROUND

The present invention relates to semiconductor device design, and more specifically, to methods and resulting structures for semiconductor devices which improve device performance.

As semiconductor manufacturing and fabrication moves to increased transistor density in the 5 nanometer (nm) technology node (and 3 nm technology node etc.), overall device performance improvements are becoming harder to achieve using traditional technology scaling. As semiconductor device design advances, additional methods and layout designs are needed to continue to improve device performance.

SUMMARY

One example embodiment includes a semiconductor device. The semiconductor device includes a power rail and a shared power source. The shared power source includes: a first power connection in a first interconnect region of the semiconductor device and connecting the power rail to a gate, a second power connection in a second interconnect region of the semiconductor device and connecting the power rail to the gate. The semiconductor device also includes a drain region connected to the gate.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions of a method. The method includes assigning at least one empty pitch in a semiconductor device design as a single fill cell, identifying a logic path for resistance improvement in the semiconductor device, identifying a single fill cell adjacent to a power source of the logic path, and flipping the identified single fill cell to create a shared-source cell may include the logic path and a pitch of the identified single fill cell. Other embodiments of this aspect include corresponding computer systems, apparatus, and computer programs recorded on one or more computer storage devices, each configured to perform the actions of the methods.

One example embodiment includes a shared power source for a semiconductor. The shared power source includes a first power connection in a first interconnect region of the semiconductor device and connecting the power rail to a gate, and a second power connection in a second interconnect region of the semiconductor device and connecting the power rail to the gate.

BRIEF DESCRIPTION OF THE DRAWINGS

FIGS. 9A-D illustrate several views of a layout for a semiconductor, according to embodiments of the present disclosure.

DETAILED DESCRIPTION

As the scale of transistors increases in modern Very-large-scale integration (VLSI) processes for creating integrated circuits (ICs), the IC layout and design of the individual transistors/devices has significant effects on the overall performance of the device. For example, local layout effects (i.e. transistor level effects) may cause performance swings in the device, where the performance can vary by e.g. 5%. Source resistance variations in the individual transistors/devices are one cause of performance variations and overall lower performance in the overall IC.

For example, a transistor in an IC includes a source region (connected to a power rail), a drain region, and a gate between the source and drain region. In some examples, the source region is connected to multiple gates/drain regions (internal nodes) and provides current to two internal nodes, which can double the current needed to transmit through the source region in order to provide correct function of the internal nodes. This layout may reduce the voltage and cause performance issues in the internal nodes/devices. In some large cells of an IC, this layout may be improved to address the performance issues by adding an additional source region such that two source regions are providing current to the two internal nodes. Additionally, in some examples, transistors/devices in the IC may have one non-shared-source region, but may still benefit from improved resistance.

The structures and methods described herein provide shared sources for a single device in an IC or semiconductor device, where the shared-source improves or increases a current that passes through the device (e.g., to the drain region), which in turn increases the performance of the device. Example improvements may include a delay improvement of the device and/or a power improvement for the device as described herein.

Figure 1:
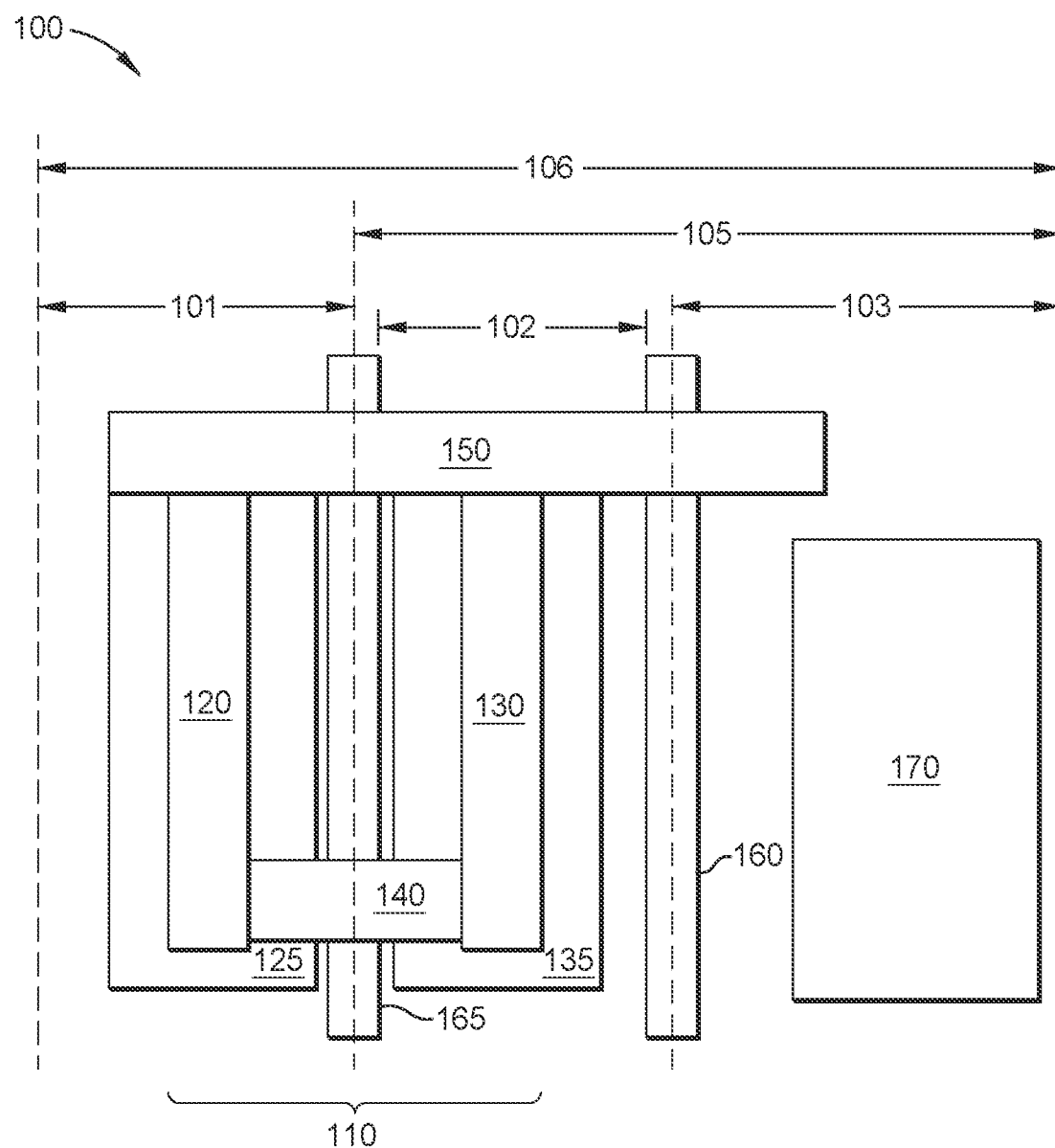
FIG. 1 illustrates a shared power source in a semiconductor device, according to embodiments of the present disclosure.

FIG. 1 illustrates a shared power source 110 in a semiconductor device such as device 100, according to embodiments of the present disclosure. The device 100 may include a transistor in an IC or other type of device/circuit implemented in the IC. The device 100 includes a shared power source 110, gate structures such as gates 160 and 165, and a drain region 170. The drain region 170 is selectively connected to the shared power source based on a gate voltage of the gate 160. The layout and interactions between the shared power source 110, the gate 160, and the drain region 170 are represented as blocks for ease of illustration in FIG. 1, but may have different shapes or structures when fabricated on a chip.

In some examples, the device 100 is connected to a power rail 150, which provides a power source/current to the device 100 via the shared power source 110. In order to improve source resistance in the device 100, the shared power source 110 includes dual power connections. While shown as a dual power connection in FIG. 1, the shared power source may include more than two shared source. The shared power source 110 includes a first power connection, first connection 120 electrically connected to the power rail 150, where the first connection 120 also connects the power rail 150 to a first diffusion region 125. The shared power source 110 also includes a second power connection, second connection 130 electrically connected to the power rail 150 where the second connection 130 also connects the power rail 150 to a second diffusion region 135. The first connection 120 is also electrically connected to the second connection 130 via source connection 140, which improves the effective resistance of the power grid to the second connection 130 by parallelizing the resistances of the power-source connections between 150 and 120 on one parallel path and 150 and 130 in the second parallel path.

In some examples, the device 100 is in a device cell 106 of which includes multiple pitches or interconnect regions of an IC. In some examples, each interconnect region or pitch has a pitch width equal to a transistor gate pitch defined for the semiconductor device. For example, in FIG. 1, the device cell 106 spans 3 pitches including pitch 101, pitch 102, and pitch 103. In some examples, the shared power source 110 spans two pitches. For example, the shared power source 110 spans the pitch 101 and the pitch 102 with connections in each of the respective pitches. The first connection 120 is in the pitch 101 and the second connection 130 is in the pitch 102.

In some examples, the device 100 with the shared power source 110 is included in an initial circuit design for an IC. For example, the initial design includes the shared power source 110 and the device 100 in the device cell 106. In some examples, the device 100 does not include the shared power source 110 in an initial design. For example, the device 100 is in an initial device cell 105 with a single power source in pitch 102. The design is then altered/updated to include the shared power source 110 during a post product design specification process, as described in relation to FIGS. 8 and 9A-D.

When the device 100 is in use, the shared power source 110 improves the source resistance of the device 100 such that the time delay of the device 100 and/or the power requirements of the device 100 are improved relative to a similar device with only one power connection. Additionally, the source resistance may be altered or updated based on a structural design or layout of the shared power source 110, as described in relation to FIGS. 2A-7B.

The embodiments shown in FIGS. 2A-7B illustrate various optional designs and layouts for the shared power source 110 including example layouts of the first connection 120, the second connection 130, and the source connection 140 described in relation to FIG. 1.

Figure 2A:
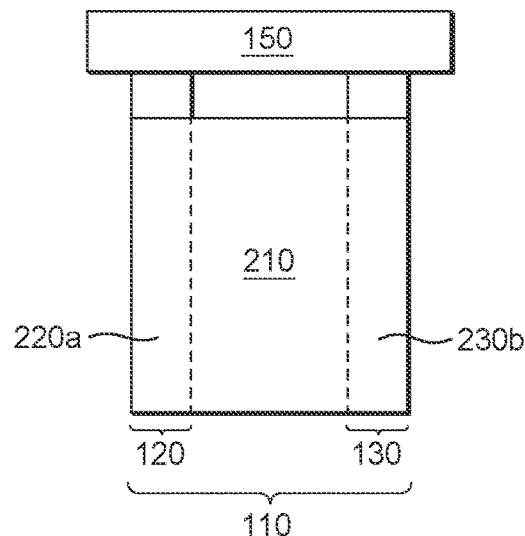
FIGS. 2A-B illustrate several views of shared power source with a plate connection, according to embodiments of the present disclosure.
Figure 2B:
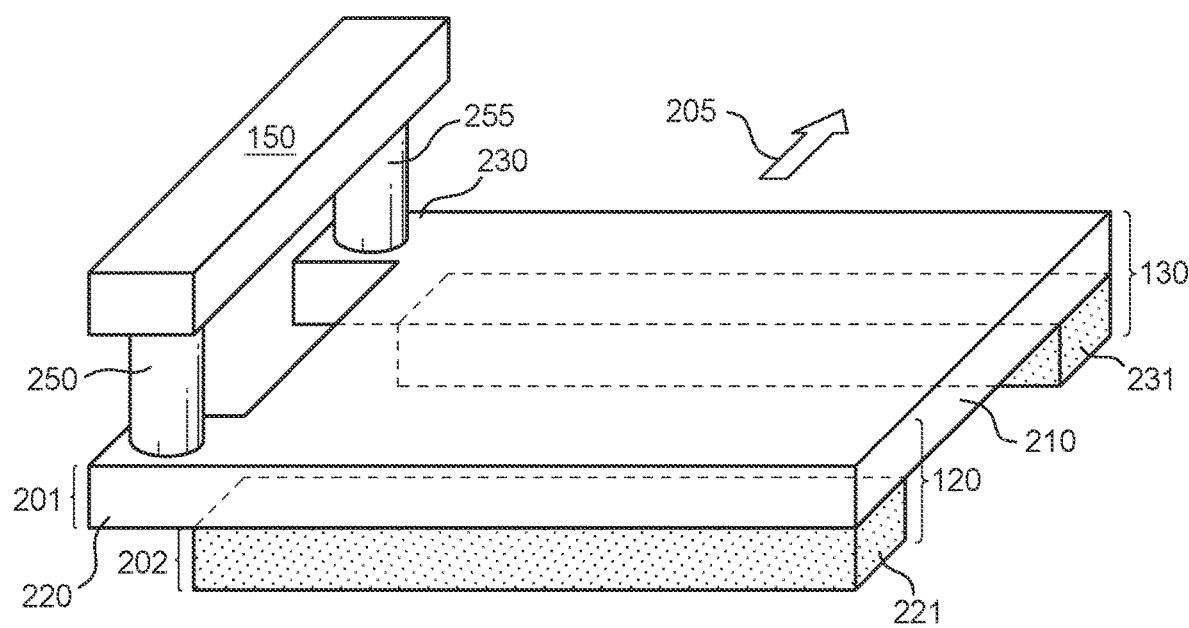

FIGS. 2A-B illustrate several views of shared power source with a plate connection, according to embodiments of the present disclosure. FIG. 2A is a top view of the shared power source 110 with a plate connection 210 and FIG. 2B is a side perspective view of the shared power source 110. As shown in FIG. 2A, the first connection 120 and the second connection 130 are connected via the plate connection 210. FIG. 2B illustrates the various layers of the power source 110 in an IC. For example, the first connection 120 includes a first local interconnect 220 in a local interconnect layer 201 and diffusion layer connection such as a first diffusion contact 221 in a diffusion layer 202. In some examples, the first local interconnect 220 includes the interconnect portion 220a positioned or formed on the first diffusion contact 221. The second connection 130 includes a second local interconnect 230 in the local interconnect layer 201 and second diffusion contact 231 in the diffusion layer 202. In some examples, the second local interconnect 230 includes the interconnect portion 230b positioned or formed on the second diffusion contact 231.

The first local interconnect 220 is connected to the power rail 150 by a first contact 250 (e.g., a via or other conductive path) and the second local interconnect 230 is connected to the power rail 150 by a second contact 255. The plate connection 210 in the local interconnect layer 201 provides electrical connectivity, that is an electrical connection, between the first connection 120 and the second connection 130 and provides a source resistance 205 through the shared power source 110.

Figure 3A:
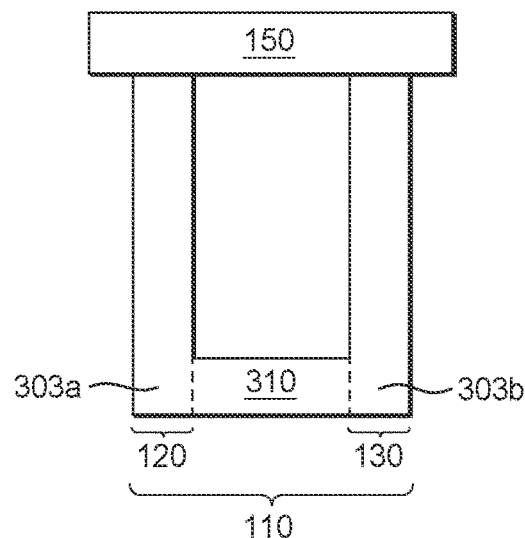
FIGS. 3A-B illustrate several views of shared power source with a wire connection, according to embodiments of the present disclosure.
Figure 3B:
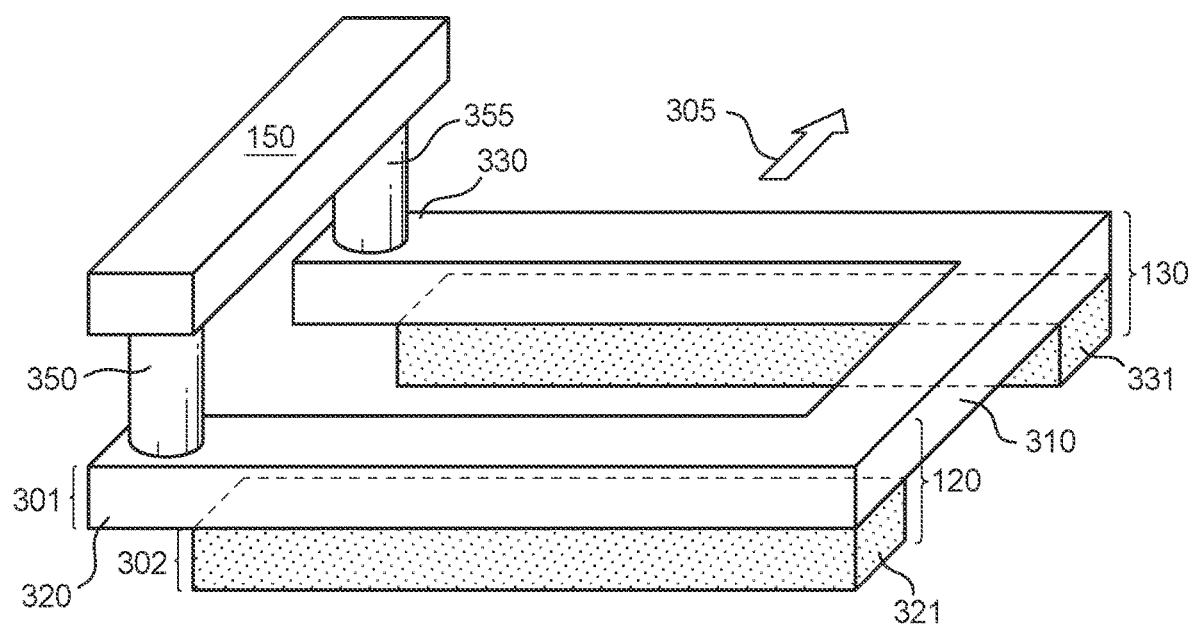

FIGS. 3A-B illustrate several views of shared power source with a wire connection, according to embodiments of the present disclosure. FIG. 3A is a top view of the shared power source 110 with a source connection wire such as a wire connection 310 and FIG. 3B is a side perspective view of the shared power source 110. As shown in FIG. 3A, the first connection 120 and the second connection 130 are connected via the wire connection 310. The wire connection 310 connects an end portion 303a of the first connection 120 to an end portion 303b of the second connection 130.

FIG. 3B illustrates the various layers of the power source 110 in an IC. For example, the first connection 120 includes a first local interconnect 320 in a local interconnect layer 301 and a first diffusion contact 321 in a diffusion layer 302. In some examples, the first local interconnect 320 includes an interconnect portion positioned or formed on the first diffusion contact 321. The second connection 130 includes a second local interconnect 330 in the local interconnect layer 301 and second diffusion contact 331 in the diffusion layer 302. In some examples, the second local interconnect 330 includes an interconnect portion positioned or formed on the second diffusion contact 331.

The first local interconnect 320 is connected to the power rail 150 by a first contact 350 (e.g., a via or other conductive path) and the second local interconnect 330 is connected to the power rail 150 by a second contact 355. The wire connection 310 is in the local interconnect layer 301 and provides electrical connectivity between the first connection 120 and the second connection 130. The power source 110 in FIGS. 3A and 3B provides a source resistance 305 through the shared power source 110.

Figure 4A:
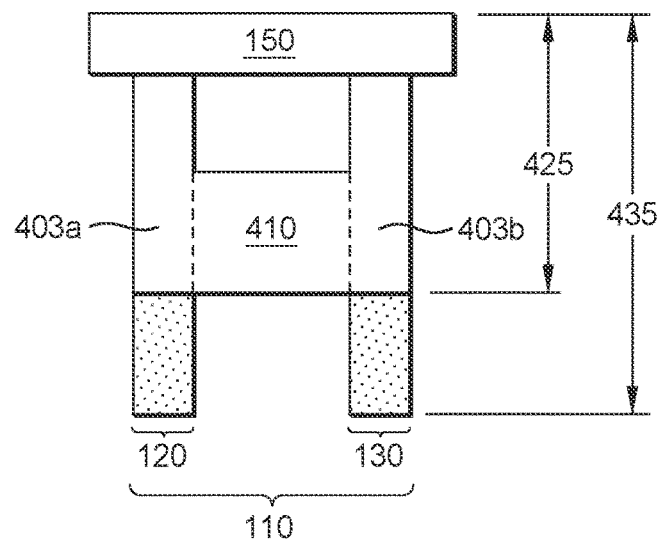
FIGS. 4A-B illustrate several views of shared power source with a wire connection, according to embodiments of the present disclosure.
Figure 4B:
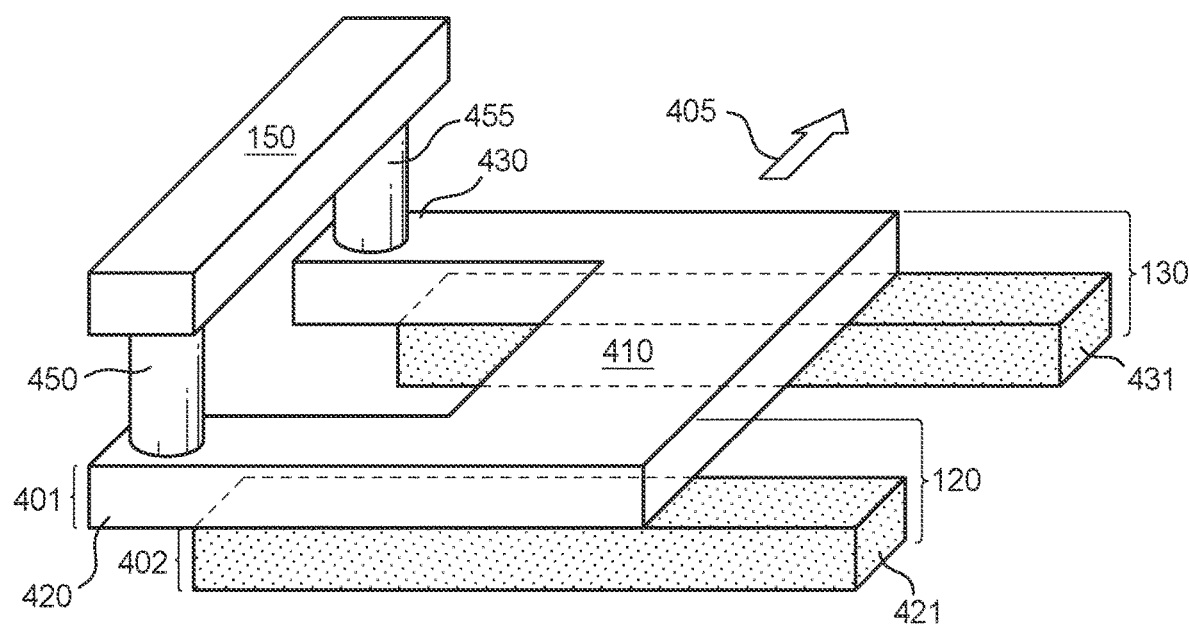

FIGS. 4A-B illustrate several views of shared power source with a wire connection, according to embodiments of the present disclosure. FIG. 4A is a top view of the shared power source 110 with a wire connection 410 and FIG. 4B is a side perspective view of the shared power source 110. As shown in FIG. 4A, the first connection 120 and the second connection 130 are connected via the wire connection 410. The wire connection 410 connects an end portion 403a of an interconnect layer of the first connection 120 to a middle portion 403b of the second connection 130.

FIG. 4B illustrates the various layers of the power source 110 in an IC. For example, the first connection 120 includes a first local interconnect 420 in a local interconnect layer 401 and a first diffusion contact 421 in a diffusion layer 402. In some examples, the first local interconnect 420 includes an interconnect portion positioned or formed on the first diffusion contact 421. The second connection 130 includes a second local interconnect 430 in the local interconnect layer 401 and second diffusion contact 431 in the diffusion layer 402. In some examples, the second local interconnect 430 includes an interconnect portion positioned or formed on the second diffusion contact 431. In the example shown in FIGS. 4A-B, the first local interconnect 420 has an associated length 425 which is shorter than an associated length 435 of the second local interconnect 430.

The first local interconnect 420 is connected to the power rail 150 by a first contact 450 (e.g., a via or other conductive path) and the second local interconnect 430 is connected to the power rail 150 by a second contact 455. The wire connection 410 is in the local interconnect layer 401 and provides electrical connectivity between the first connection 120 and the second connection 130. The power source 110 in FIGS. 4A and 4B provides a source resistance 405 through the shared power source 110.

Figure 5A:
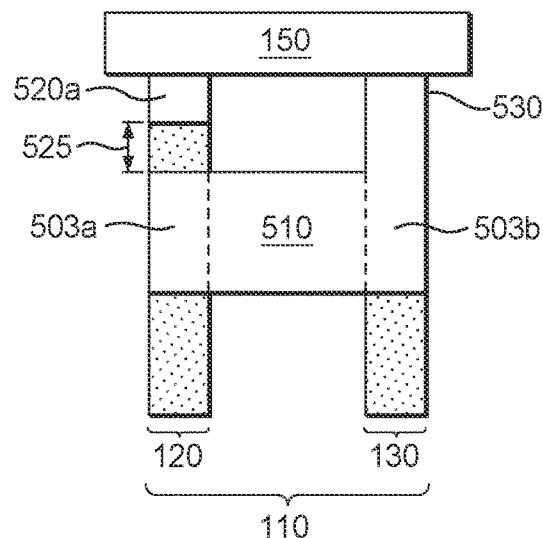
FIGS. 5A-B illustrate several views of shared power source with a diffusion contact section, according to embodiments of the present disclosure.
Figure 5B:
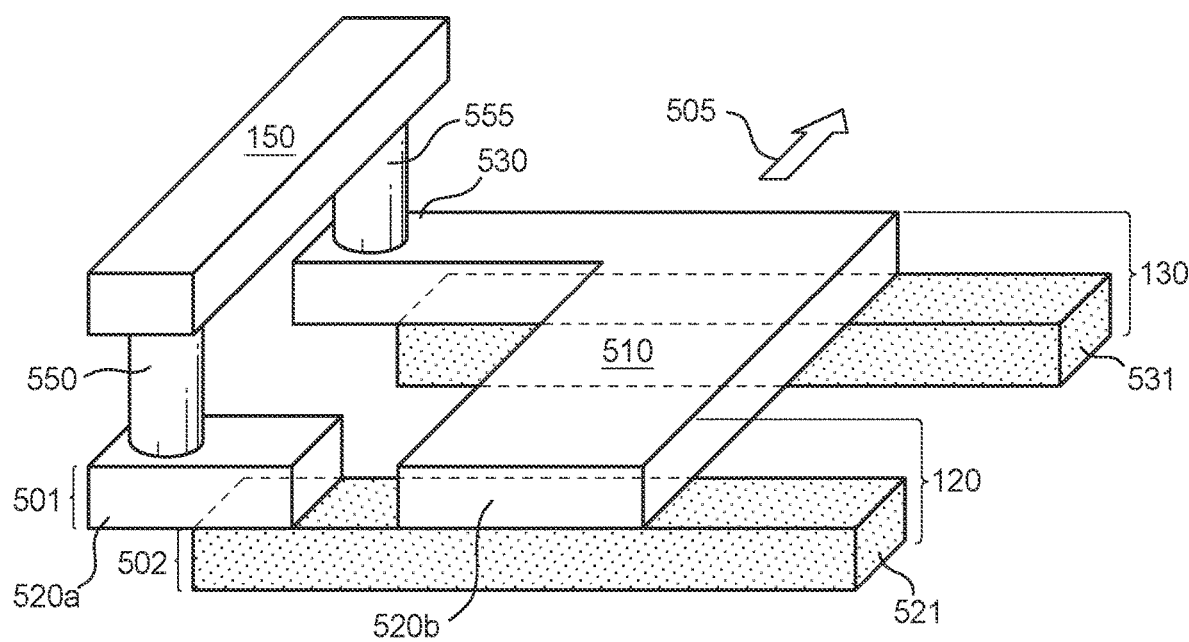

FIGS. 5A-B illustrate several views of shared power source with a wire connection, according to embodiments of the present disclosure. FIG. 5A is a top view of the shared power source 110 with a wire connection 510 and FIG. 5B is a side perspective view of the shared power source 110. As shown in FIG. 5A, the first connection 120 and the second connection 130 are connected via the wire connection 510. The wire connection 510 connects an end portion 503a of an interconnect layer of the first connection 120 to a middle portion 503b of the second connection 130.

FIG. 5B illustrates the various layers of the power source 110 in an IC. For example, the first connection 120 includes a first local interconnect 520a and a second local interconnect 520b in a local interconnect layer 501 and a first diffusion contact 521 in a diffusion layer 502. In some examples, the first local interconnect 520a includes a small interconnect portion positioned or formed on the first diffusion contact 521 and the second local interconnect 520b is positioned or formed on the first diffusion contact 521.

The second connection 130 includes a third local interconnect 530 in the local interconnect layer 501 and second diffusion contact 531 in the diffusion layer 502. In some examples, the third local interconnect 530 includes an interconnect portion positioned or formed on the second diffusion contact 531. In the example shown in FIGS. 5A-B, the first local interconnect 120 has an associated gap 525 in the local interconnect layer 501 between the first local interconnect 520a and a second local interconnect 520b. In this example, the current traveling through the first connection 120 travels via the first diffusion contact 521 between the first local interconnect 520a and the second local interconnect 520b.

The first local interconnect 520a is connected to the power rail 150 by a first contact 550 (e.g., a via or other conductive path) and the third local interconnect 530 is connected to the power rail 150 by a second contact 555. The wire connection 510 is in the local interconnect layer 501 and provides electrical connectivity between the first connection 120 and the second connection 130 via the second local interconnect 520b. The power source 110 in FIGS. 5A and 5B provides a source resistance 505 through the shared power source 110.

Figure 6A:
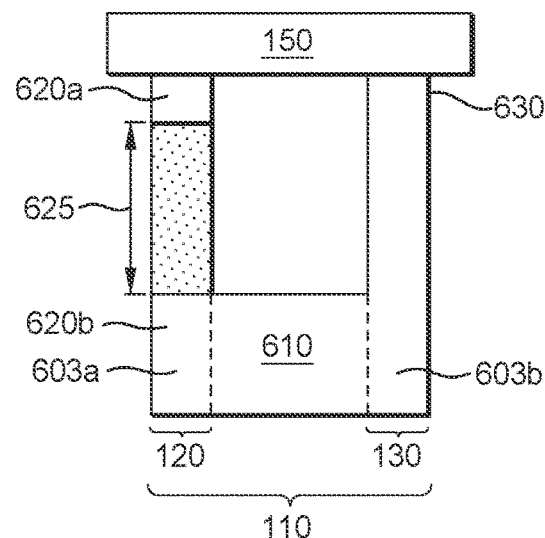
FIGS. 6A-B illustrate several views of shared power source with a diffusion contact section, according to embodiments of the present disclosure.
Figure 6B:
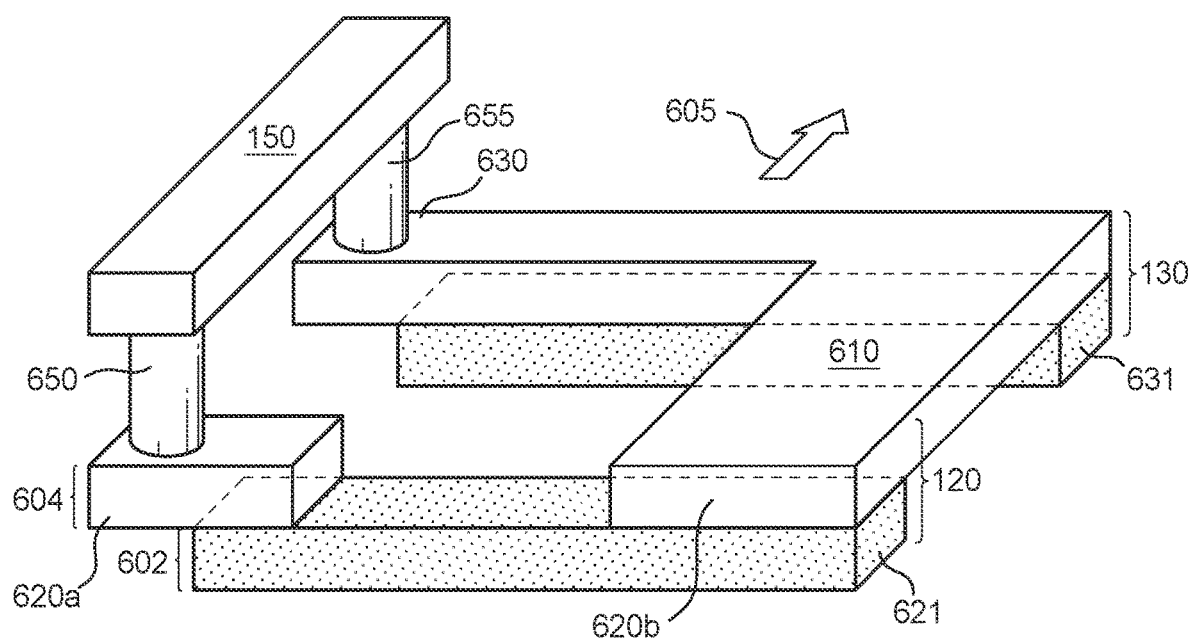

FIGS. 6A-B illustrate several views of shared power source with a wire connection, according to embodiments of the present disclosure. FIG. 6A is a top view of the shared power source 110 with a wire connection 610 and FIG. 6B is a side perspective view of the shared power source 110. As shown in FIG. 6A, the first connection 120 and the second connection 130 are connected via the wire connection 610. The wire connection 610 connects an end portion 603a of the first connection 120 to an end portion 603b of the second connection 130.

FIG. 6B illustrates the various layers of the power source 110 in an IC. For example, the first connection 120 includes a first local interconnect 620a and a second local interconnect 620b in a local interconnect layer 601 and a first diffusion contact 621 in a diffusion layer 602. In some examples, the first local interconnect 620a includes a small interconnect portion positioned or formed on the first diffusion contact 621 and the second local interconnect 620b is positioned or formed on the first diffusion contact 621.

The second connection 130 includes a third local interconnect 630 in the local interconnect layer 601 and second diffusion contact 631 in the diffusion layer 602. In some examples, the third local interconnect 630 includes an interconnect portion positioned or formed on the second diffusion contact 631. In the example shown in FIGS. 6A-B, the first local interconnect 120 has an associated gap 625 in the local interconnect layer 601 between the first local interconnect 620a and a second local interconnect 620b. In some examples, the gap 625 is larger than the gap 525 shown in FIG. 5B. In this example, the current traveling through the first connection 120 travels via the first diffusion contact 621 between the first local interconnect 620a and the second local interconnect 620b.

The first local interconnect 620a is connected to the power rail 150 by a first contact 650 (e.g., a via or other conductive path) and the third local interconnect 630 is connected to the power rail 150 by a second contact 655. The wire connection 610 is in the local interconnect layer 601 and provides electrical connectivity between the first connection 120 and the second connection 130 via the second local interconnect 620b. The power source 110 in FIGS. 6A and 6B provides a source resistance 605 through the shared power source 110.

Figure 7A:
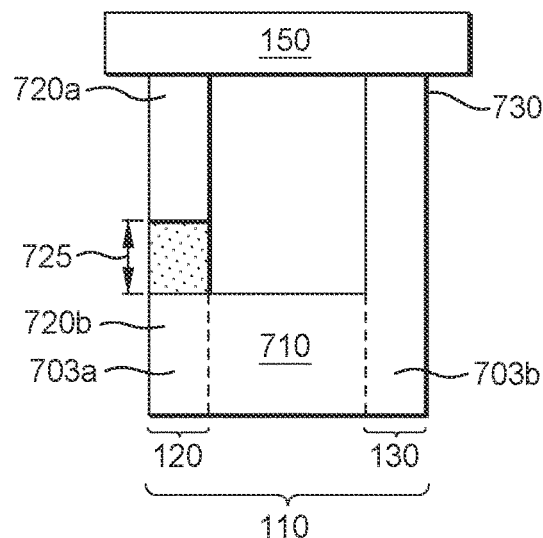
FIGS. 7A-B illustrate several views of shared power source with a diffusion contact section, according to embodiments of the present disclosure.
Figure 7B:
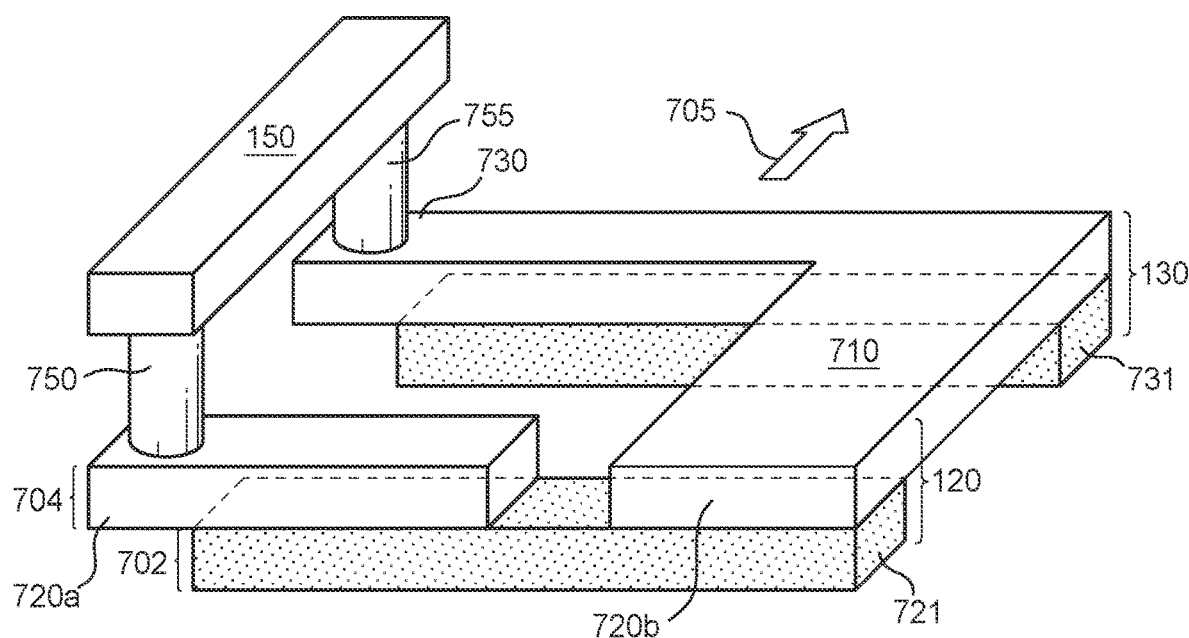

FIGS. 7A-B illustrate several views of shared power source with a wire connection, according to embodiments of the present disclosure. FIG. 7A is a top view of the shared power source 110 with a wire connection 710 and FIG. 7B is a side perspective view of the shared power source 110. As shown in FIG. 7A, the first connection 120 and the second connection 130 are connected via the wire connection 710. The wire connection 710 connects an end portion 703a of the first connection 120 to an end portion 703b of the second connection 130.

FIG. 7B illustrates the various layers of the power source 110 in an IC. For example, the first connection 120 includes a first local interconnect 720a and a second local interconnect 720b in a local interconnect layer 701 and a first diffusion contact 721 in a diffusion layer 702. In some examples, the first local interconnect 720a includes a small interconnect portion positioned or formed on the first diffusion contact 721 and the second local interconnect 720b is positioned or formed on the first diffusion contact 721.

The second connection 130 includes a third local interconnect 730 in the local interconnect layer 701 and second diffusion contact 731 in the diffusion layer 702. In some examples, the third local interconnect 730 includes an interconnect portion positioned or formed on the second diffusion contact 731. In the example shown in FIGS. 7A-B, the first local interconnect 120 has an associated gap 725 in the local interconnect layer 701 between a first local interconnect 720a and a second local interconnect 720b. In some examples, the gap 725 is smaller than the gap 625 shown in FIG. 6B and the first local interconnect 720a extends further from the first contact 750 than the first local interconnect 620a extends from the first contact 650. In this example, the current traveling through the first connection 120 travels via the first diffusion contact 721 between the first local interconnect 720a and the second local interconnect 720b.

The first local interconnect 720a is connected to the power rail 150 by a first contact 750 (e.g., a via or other conductive path) and the third local interconnect 730 is connected to the power rail 150 by a second contact 755. The wire connection 710 is in the local interconnect layer 701 and provides electrical connectivity between the first connection 120 and the second connection 130 via the second local interconnect 720b. The power source 110 in FIGS. 7A and 7B provides a source resistance 705 through the shared power source 110.

Figure 8:
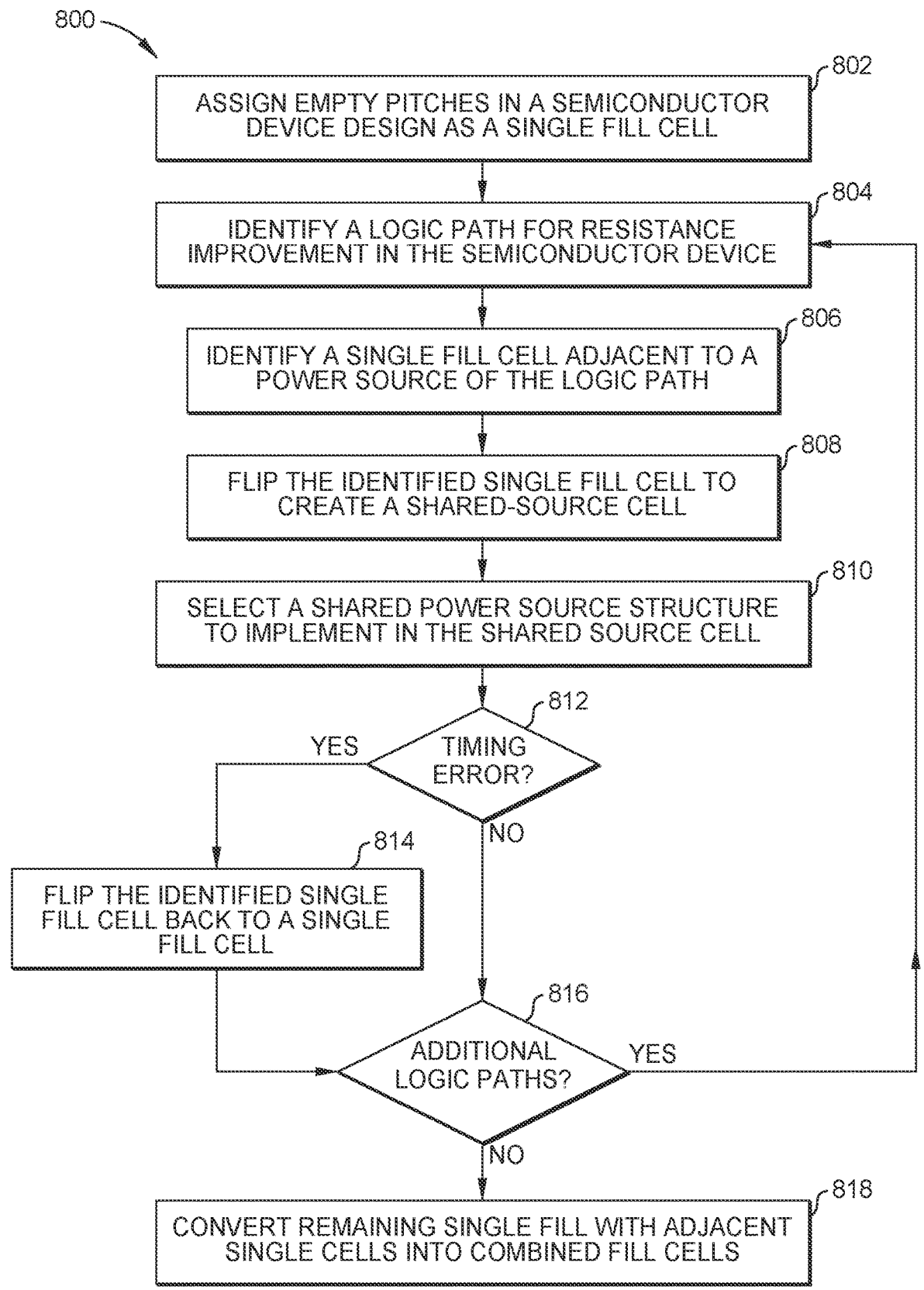
FIG. 8 is a flowchart of a method for implementing and testing a shared power source in a semiconductor device, according to embodiments of the present disclosure.

FIG. 8 is a flowchart of a method 800 for implementing and testing a shared power source in a semiconductor device, according to embodiments of the present disclosure. The method 800 may be performed as part of an automated place and route synthesis process, where design improvements for an IC are determined and tested. For example, various timing and layout improvements for an IC may be determined and tested by a testing system, such as a computer system, system 1000, described in relation to FIG. 10 herein. In some examples, the method 800 provides for opportunistic use of shared-source cells, such as the shared-source cells described in FIGS. 1-7B, without requiring place and route tooling associated with a device fabricator to consider an additional set of design libraries which may have complicated area/performance trade-offs.

For ease of discussion, reference will be made to FIGS. 1-7B as well as FIGS. 9A-D, during the discussion of method 800. FIGS. 9A-D illustrate several views of a layout (collectively: layout 900) for a semiconductor during a design testing and verification process, according to embodiments of the present disclosure. Method 800 begins at block 802, where the system 1000 assigns at least one empty pitch in a semiconductor device design as a single fill cell. For example, the system 1000 assigns empty pitches in a layout 900a of FIG. 9A as single fill cells.

Figure 9A:
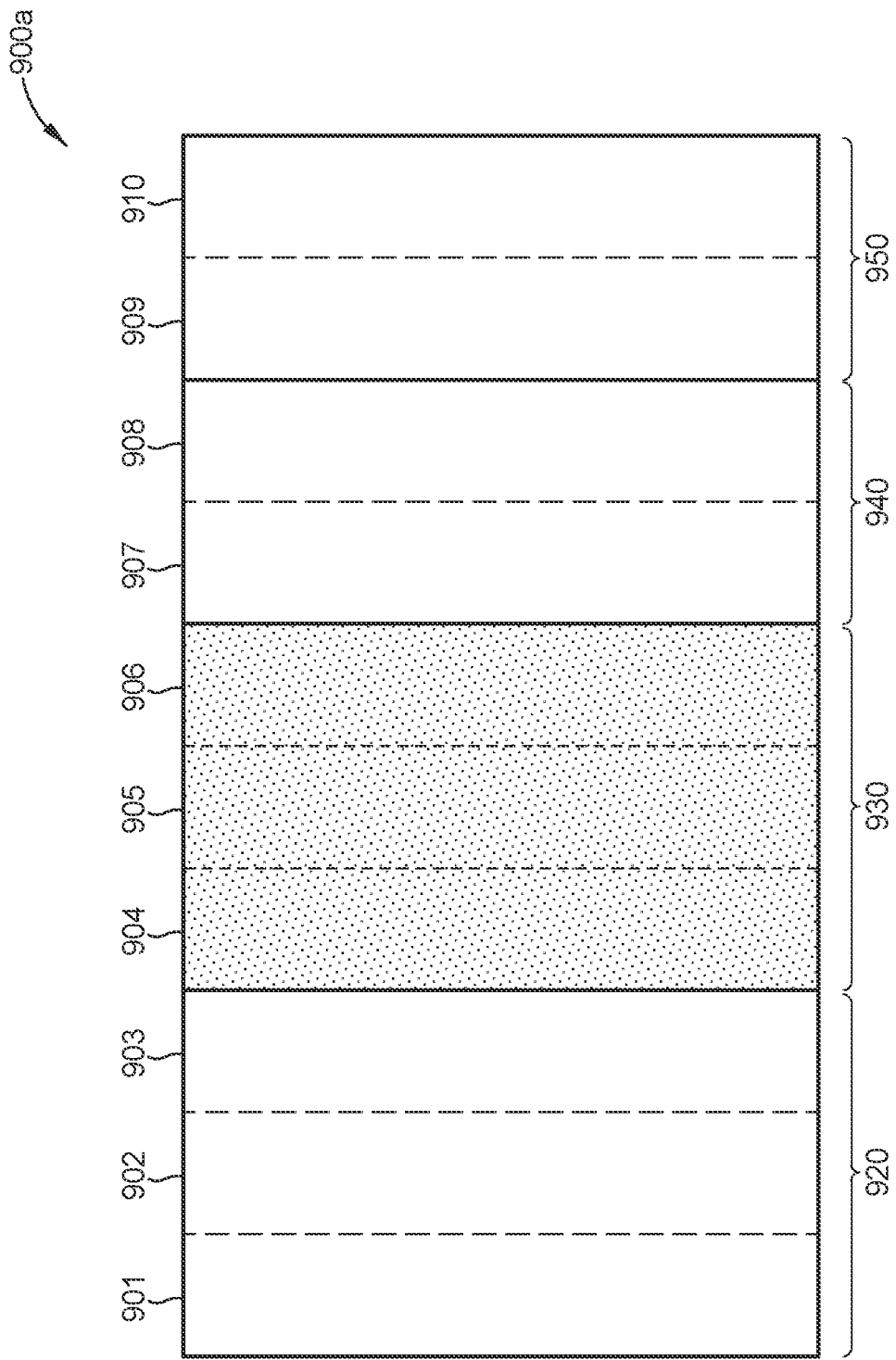
Figure 9B:
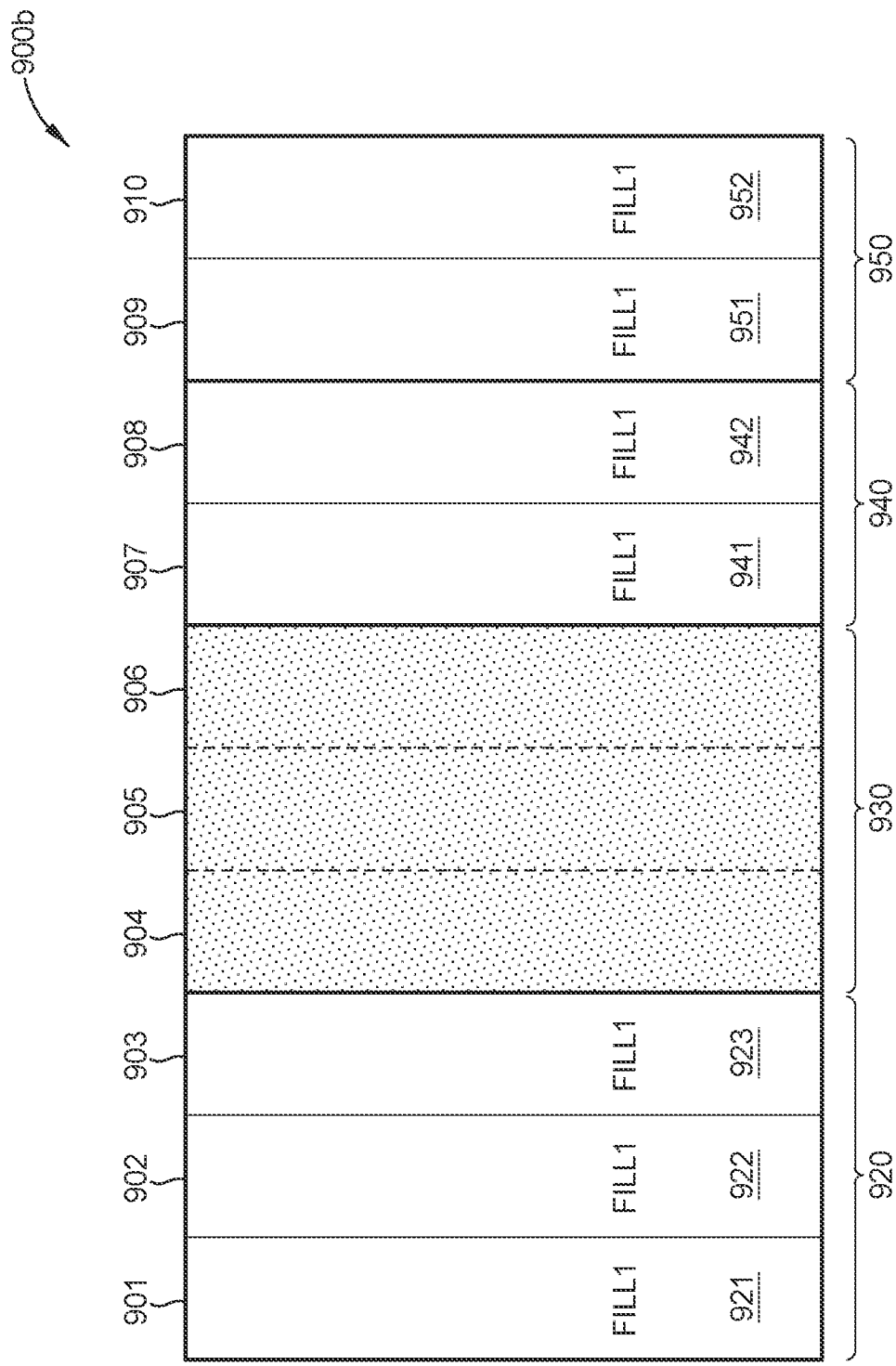
Figure 9D:
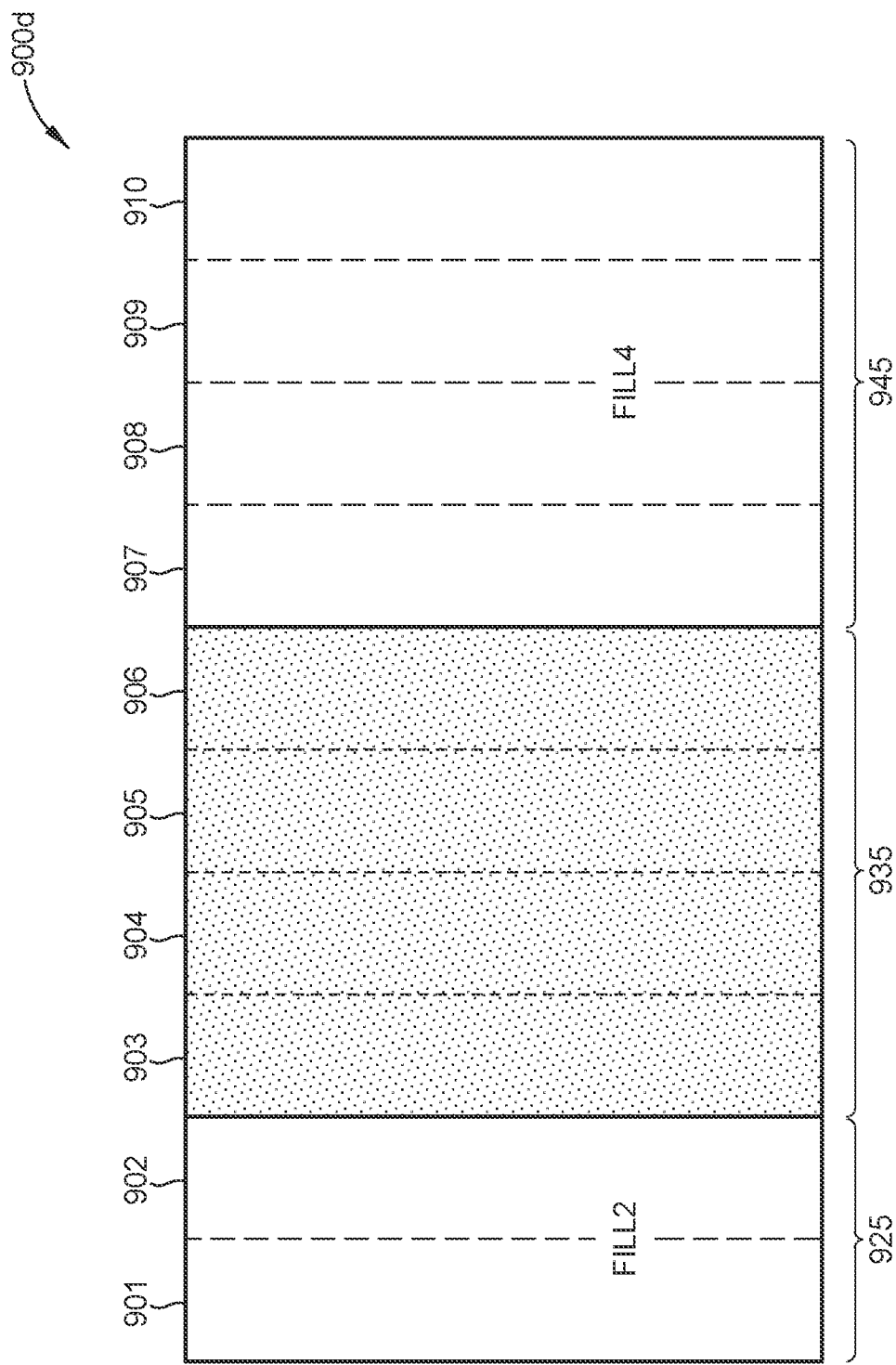

FIG. 9A illustrates the layout 900a for a semiconductor device. The layout 900a includes cells 920, 930, 940, and 950 as well as pitches 901-910. The pitches 901-903 are part of cell 920, the pitches 904-906 are part of cell 930, the pitches 907 and 908 are part of cell 940, and the pitches 909 and 910 are part of the cell 950. The cell 930 is a device cell where a device or transistor is located in the layout 900a. The cells 920, 940, and 950 are empty cells and the associated pitches are empty pitches. The system 1000 converts the pitches of the cells 920, 940, and 950 to single fill cells (e.g., FILL1 cells) as shown in FIG. 9B. FIG. 9B illustrates the layout 900b for a semiconductor device. The layout 900b includes single fill cells 921-923, 941-942, and 951-952. Each of the empty pitches 901-903, 907-910, are now respective single fill cells.

Returning back to FIG. 8, at block 804, the system 1000 identifies a logic path for resistance improvement in the semiconductor device. For example, the system 1000 identifies the logic path associated with the device in cell 930 as potentially benefiting from source resistance improvement. In some examples, the potential improvement may be an improvement to a timing delay of the device or a power requirement of the device.

At block 806, the system 1000 identifies a single fill cell adjacent to a power source of the logic path. The system 1000 flips the identified single fill cell to create a shared-source cell comprising the logic path and a pitch of the identified single fill cell at block 808. For example, when a power source is in the pitch 904 in FIG. 9C, the system 1000 identifies the cell 923 as a potential shared power source location and flips the cell 923 from a single fill cell to join the cell 930. The resulting shared-source device cell 935 includes the pitch 903, where a shared-source power connection may be placed.

At block 810, the system 1000 determines a desired source resistance improvement for the shared-source cell and selects, using the desired source resistance, a shared power source structure to implement in the shared-source cell. For example, the system 1000 estimates or otherwise determines a resistance needed through a shared power source to provide the desired improvements in the timing delay or the power requirements for the device in the cell 935. In some example, the system 1000 selects from one of the various shared power source design structures shown in FIGS. 2A-7B based on the respective source resistance(s) 205-705 provided by each of the shared power source designs in the Figs. Additionally, other considerations may be utilized in selecting from the various shared power source designs, including location of the cell 935 in an IC, ease of manufacture of the shared power source, effects of the shared power source on adjacent cells and devices, etc.

In some examples, at block 812 the system 1000 checks an updated timing of the logic path with the shared-source cell using the shared-source power connection information. For example, the system 1000 factors in the source resistance improvement and rechecks or revalidates the timing of the layout 900c. In some examples, the source resistance improvement may cause a timing error and/or other types of errors for an associated logic path and thus not an overall improvement in performance for the layout 900c. When the updated timing of the logic path includes a timing or other type of error for the logic path, the method 800 proceeds to block 814, where the system flips the identified single fill cell back to a single fill cell. For example, the cell 923 in the layout 900c is flipped back to a single fill cell and the cell 935 is converted back to the cell 930.

In an example where the updated timing of the logic path is improved from an original timing implementing the shared-source cell, method 800 proceeds to block 816 where the 1000 system determines whether all potential shared source single fill cells are created in the semiconductor device. For example, the layout 900 may include more pitches and cells beyond what is shown in FIGS. 9A-D and the system 1000 iteratively progresses through various devices and logic paths in the IC and layout 900 to add shared-source power connections when possible and beneficial to the overall IC. When additional shared-source power connection are possible (i.e., logic paths or device still require improvement) the method 800 proceeds back to block 804.

If no additional logic paths are found, the method 800 proceeds to block 818. At block 818, the system converts remaining single fill with adjacent single cells into combined fill cells. In some examples, in order to reduce a cell count number in the layout 900, the single fill cells created at block 802 are converted to combined fill cells (e.g., FILL2/3/4)

cells. For example, the pitches 901 and 902 are converted to cell 925, a FILL2 cell, and pitches 907-910 are converted to a cell 945, a FILL4 cell.

Figure 10:
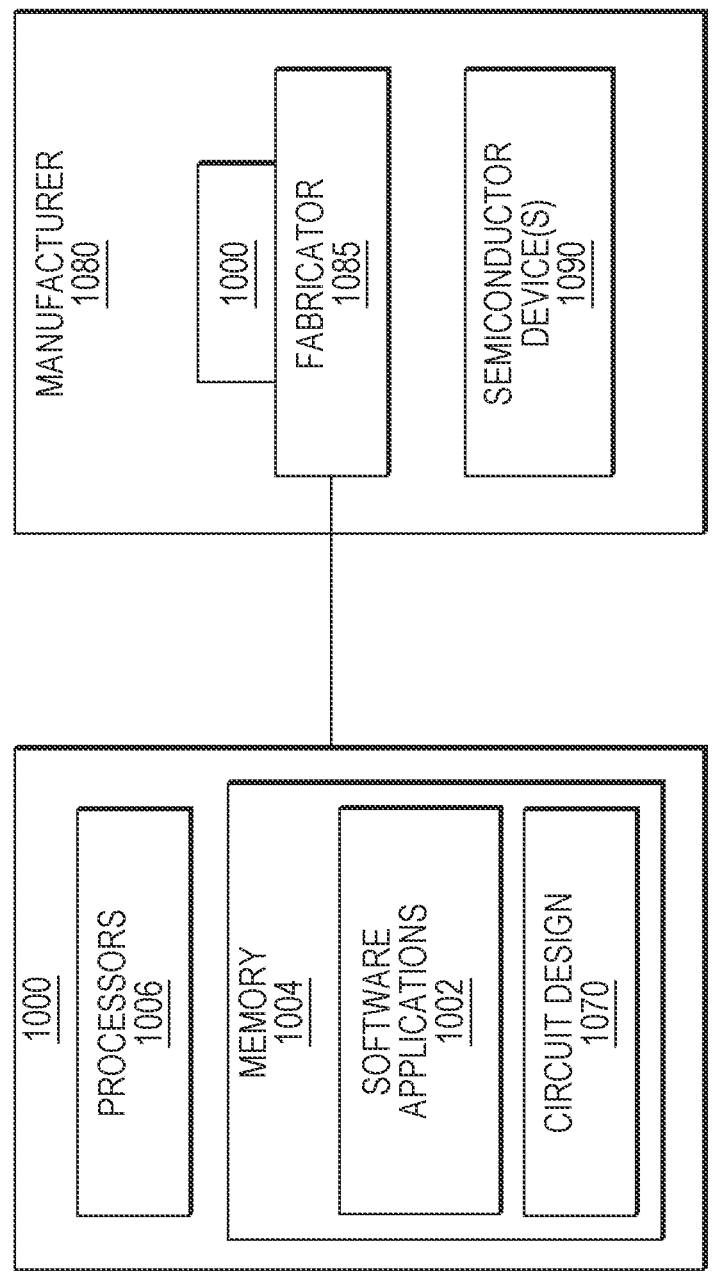
FIG. 10 is a block diagram of a computer system integrated with a manufacturer, according to embodiments of the present disclosure.

FIG. 10 is a block diagram of a computer system, system 1000, integrated with a manufacturer, according to embodiments of the present disclosure. A device 100 and layout 900 are designed and constructed by the software application 1002 of the system 1000 to build the semiconductor device (e.g., an integrated circuit). The system 1000 is configured to guarantee design rule cleanliness (i.e., pass) for the semiconductor device before and/or without requiring a design rule check. The software applications 1002 are coupled to design functions which design systems such as integrated circuits and printed circuit boards. The tools work together in a design flow that chip designers use to design and analyze entire semiconductor chips. In some examples, the system 1000 is coupled to, integrated with, and/or part of the fabrication equipment such as fabricator 1085 at a manufacturing fabrication site, manufacturer 1080. The fabricator 1085 fabricates semiconductor device(s) 1090. The system 1000 includes one or more processors 1006 configured to execute one or more software applications 1002 in memory 1004 to perform operations such as the method 800.

In some examples, the system 1000 receives input of a design 1070 for the semiconductor device 1090, and the system 1000 develops/forms layouts/designs for the device 100 according to the methods describe herein. The semiconductor layout is a physical design released to the manufacturer 1080 and physically fabricated by the fabricator 1085 to produce the semiconductor device 1090.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A semiconductor device comprising:
   a power rail;
   a shared power source comprising:
      a first power connection in a first interconnect region of the semiconductor device and connecting the power rail to a first diffusion region;
      a second power connection in a second interconnect region of the semiconductor device and connecting the power rail to a second diffusion region; and
   a drain region that is selectively connected to the second diffusion region based on a gate voltage.

2. The semiconductor device of claim 1, wherein the first interconnect region and the second interconnect region comprises a pitch width equal to a transistor gate pitch defined for the semiconductor device.

3. The semiconductor device of claim 1, wherein the shared power source further comprises:
   a plate connection in a local interconnect layer connecting the first power connection and the second power connection in the local interconnect layer.

4. The semiconductor device of claim 1:
   wherein the first power connection comprises:
      a first contact connected to the power rail;
      a first local interconnect in a local interconnect layer connected to the first contact;
   wherein the second power connection comprises:
      a second contact on the power rail;
      a second local interconnect in the local interconnect layer connected to the second contact; and
   wherein the shared power source further comprises a source connection wire in the local interconnect layer between the first power connection and the second power connection.

5. The semiconductor device of claim 4, wherein the source connection wire provides an electrical connection from an end portion of the first local interconnect to a middle portion of the second local interconnect.

6. The semiconductor device of claim 4, wherein the source connection wire provides an electrical connection from an end portion of the first local interconnect to an end portion of the second local interconnect.

7. The semiconductor device of claim 4,
   wherein the first power connection further comprises:
      a diffusion layer connection connected to the first local interconnect;
      a third local interconnect in the local interconnect layer connected to the diffusion layer connection; and
   wherein the source connection wire connects the third local interconnect to the second local interconnect.

8. The semiconductor device of claim 7, wherein the source connection wire provides an electrical connection from the third local interconnect to a middle portion of the second local interconnect.

9. The semiconductor device of claim 7, wherein the source connection wire provides an electrical connection from the third local interconnect to an end portion of the second local interconnect.

10. The semiconductor device of claim 7, wherein the first local interconnect comprises a first length extending from the first contact, wherein the first length is less than a length of the second local interconnect.

11. A shared power source for a semiconductor device comprising:
   a first power connection in a first interconnect region of the semiconductor device and connecting a power rail to a first diffusion region; and a second power connection in a second interconnect region of the semiconductor device and connecting the power rail to a second diffusion region.

12. The shared power source of claim 11, wherein the shared power source further comprises:
a plate connection in a local interconnect layer connecting the first power connection and the second power connection in the local interconnect layer.

13. The shared power source of claim 11,
wherein the first power connection comprises:
a first contact connected to the power rail;
a first local interconnect in a local interconnect layer connected to the first contact;
wherein the second power connection comprises:
a second contact on the power rail;
a second local interconnect in the local interconnect layer connected to the second contact; and
wherein the shared power source further comprises a source connection wire in the local interconnect layer between the first power connection and the second power connection.

14. The shared power source of claim 13,
wherein the first power connection further comprises:
a diffusion layer connection connected to the first local interconnect;
a third local interconnect in the local interconnect layer connected to the diffusion layer connection; and
wherein the source connection wire connects the third local interconnect to the second local interconnect.

* * * * *